(12) United States Patent
Boethel et al.

(10) Patent No.: US 10,414,387 B2
(45) Date of Patent: *Sep. 17, 2019

(54) METHOD AND DEVICE FOR ELECTRONICALLY CONTROLLING A VEHICLE DECELERATION IN AN ABS BRAKING SYSTEM

(71) Applicant: WABCO GmbH, Hannover (DE)

(72) Inventors: Andreas Boethel, Harsum (DE); Horst Eckert, Rehburg-Loccum (DE); Torsten Wallbaum, Duingen (DE)

(73) Assignee: WABCO GMBH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/558,208

(22) PCT Filed: Feb. 26, 2016

(86) PCT No.: PCT/EP2016/000667
§ 371 (c)(1),
(2) Date: Sep. 14, 2017

(87) PCT Pub. No.: WO2016/188602
PCT Pub. Date: Dec. 1, 2016

(65) Prior Publication Data
US 2018/0072290 A1 Mar. 15, 2018

(30) Foreign Application Priority Data
May 23, 2015 (DE) .................. 10 2015 006 738

(51) Int. Cl.
*B60T 8/1766* (2006.01)
*B60T 8/26* (2006.01)
(Continued)

(52) U.S. Cl.
CPC .......... *B60T 8/1766* (2013.01); *B60T 8/1708* (2013.01); *B60T 8/1761* (2013.01); *B60T 8/321* (2013.01); *B60T 8/341* (2013.01)

(58) Field of Classification Search
CPC ...... B60T 8/1708; B60T 8/3225; B60T 8/172; B60T 8/4077; B60T 8/1764;
(Continued)

(56) References Cited

U.S. PATENT DOCUMENTS 2,279,433 A * 4/1942 Logan, Jr. ............... B60T 8/322
188/181 R
4,198,101 A * 4/1980 Oberthur ................... B60T 8/26
188/195
(Continued)

FOREIGN PATENT DOCUMENTS

DE 4007360 A1 9/1991
DE 102006045317 A1 * 5/2007 ............ B60T 8/1766
(Continued)

*Primary Examiner* — Yuri Kan
(74) *Attorney, Agent, or Firm* — Leydig, Voit & Mayer, Ltd.

(57) ABSTRACT

A method for controlling a vehicle deceleration in a vehicle comprising an ABS braking system includes detecting a setpoint vehicle deceleration predetermined by a driver; establishing a maximum deceleration and a minimum deceleration, in each case as a function of the detected setpoint vehicle deceleration; detecting an actual vehicle deceleration; and controlling a brake pressure at wheel brakes of a vehicle axle to be controlled as a function of the detected actual vehicle deceleration by controlling ABS brake valves. Controlling the brake pressure at the wheel brakes of the vehicle axle as a function of the detected actual vehicle deceleration comprises: increasing the brake pressure at the wheel brakes when the actual vehicle deceleration is less than the minimum deceleration, and limiting the brake
(Continued)

pressure at the wheel brakes when the actual vehicle deceleration is greater than the maximum deceleration.

18 Claims, 5 Drawing Sheets

(51) Int. Cl.
*B60T 8/1761* (2006.01)
*B60T 8/52* (2006.01)
*B60T 8/18* (2006.01)
*B60T 8/17* (2006.01)
*B60T 8/32* (2006.01)
*B60T 8/34* (2006.01)

(58) Field of Classification Search
CPC ........ B60T 8/1766; B60T 8/1761; B60T 8/58; B60T 8/18; B60T 8/26; B60T 7/12; B60T 8/173; B60T 11/34; B60T 8/52; B62K 25/08

See application file for complete search history.

(56) References Cited

U.S. PATENT DOCUMENTS

| | | | | |
|---|---|---|---|---|
| 4,552,373 | A * | 11/1985 | Kawaguchi | B62K 25/08 180/219 |
| 4,564,244 | A * | 1/1986 | Reinartz | B60T 11/34 188/349 |
| 4,938,544 | A * | 7/1990 | Braschel | B60T 8/173 188/181 C |
| 5,163,742 | A | 11/1992 | Toepfer et al. | |
| 5,445,444 | A * | 8/1995 | Rump | B60T 7/12 303/113.2 |
| 7,611,212 | B2 * | 11/2009 | Nakayama | B60T 8/3225 303/137 |
| 2007/0188020 | A1 * | 8/2007 | Schmidt | B60T 8/1764 303/149 |
| 2013/0332043 | A1 | 12/2013 | Svensson et al. | |
| 2014/0180555 | A1 * | 6/2014 | Eckert | B60T 8/1708 701/79 |
| 2015/0046057 | A1 | 2/2015 | Lauser et al. | |
| 2016/0355168 | A1 * | 12/2016 | Ninoyu | B60T 8/4077 |
| 2017/0182990 | A1 * | 6/2017 | Ninoyu | B60T 8/172 |

FOREIGN PATENT DOCUMENTS

| | | | | |
|---|---|---|---|---|
| DE | 102006045317 | A1 | 5/2007 | |
| DE | 102006032064 | A1 | 1/2008 | |
| DE | 102008009948 | B3 | 10/2009 | |
| DE | 102009021685 | A1 * | 11/2010 | ............ B60T 13/586 |
| DE | 102009021685 | A1 | 11/2010 | |
| DE | 102011017018 | A1 * | 7/2012 | ................ B60T 8/18 |
| DE | 102011017018 | B3 | 7/2012 | |
| DE | 102011118130 | A1 * | 5/2013 | ................ B60T 8/58 |
| DE | 102011118130 | B4 | 8/2013 | |
| DE | 102013207127 | A1 | 12/2013 | |

* cited by examiner

METHOD AND DEVICE FOR ELECTRONICALLY CONTROLLING A VEHICLE DECELERATION IN AN ABS BRAKING SYSTEM

CROSS REFERENCE TO RELATED APPLICATIONS

This application is a U.S. National Stage Application under 35 U.S.C. § 371 of International Application No. PCT/EP2016/000667 filed on Feb. 26, 2016, and claims benefit to German Patent Application No. DE 10 2015 006 738.9 filed on May 23, 2015. The International Application was published in German on Dec. 1, 2016 as WO 2016/188602 A1 under PCT Article 21(2).

FIELD

The invention relates to a method for electronically controlling a vehicle deceleration in an ABS braking system, in particular in a commercial vehicle, by adjusting the brake pressure at a vehicle axle to be controlled as a function of a present actual vehicle deceleration, and to a device for carrying out the method.

BACKGROUND

In commercial vehicles, brake pressure control which limits the brake pressure (electronic brake force limiter, EBL) is used, in particular, for distributing the braking effect desired by a braking system or a driver to the vehicle axles in a suitable way, and so the vehicle is decelerated according to a driver's intent, which is predetermined by a driver, or according to a setpoint vehicle deceleration and simultaneously remains stable according to the driving situation. This is the case because, in the event of strong braking, i.e. in the event of a high setpoint vehicle deceleration, the vehicle weight is displaced onto the front axle, and so rear wheels on the rear axle are pressed less strongly onto the underlying surface, whereby a lockup of the rear wheels is supported.

By limiting the brake pressure at wheel brakes of the rear wheels, a premature lockup of the rear wheels can be avoided when braking is carried out. The brake pressure can be limited according to an axle load, since, in the case of heavily loaded vehicles, more braking force can be applied onto the road via the rear axle than is the case with unloaded vehicles, in which a braking of the rear wheels that is too strong further amplifies the above-described effect; the tendency of the rear wheels to lock up increases.

A mechanical displacement sensor can be provided for measuring the load of leaf-sprung vehicles; the mechanical displacement sensor is deflected to a greater or lesser extent depending on the load. In air-sprung vehicles, a pressure sensor that measures the pressure in a support bellows can be utilized for this purpose. Depending on the load-dependent measured signal, the weight can be inferred and, depending thereon, a limitation of the brake pressure can be carried out.

In vehicles without such a mechanical displacement sensor or pressure sensor, in which a direct measurement of the load is not provided, an electronic brake pressure limitation can be provided. In this case, a control of the brake pressure is carried out at the wheel brakes of the rear wheels as a function of a difference between a wheel speed of the front wheels and the wheel speed of the rear wheels or as a function of the difference between a brake slip of the front wheels and the brake slip of the rear wheels. Since the difference in the wheel speeds or the brake slips is load-dependent, the brake pressure is correspondingly distributed onto the vehicle axles, in order to prevent the wheels of the rear axle from prematurely exhibiting a tendency to lock up and in order to decelerate the vehicle as desired.

DE 10 2008 009 948 B3 discloses an electronic brake pressure control in which the brake pressure at the wheel brakes is controlled depending on an axle load sensor and the setpoint vehicle deceleration. In the event of failure of the axle load sensor, the brake pressure is controlled as a function of the difference of the brake slips at the vehicle axles, i.e. as the function of a measured actual differential slip.

DE 10 2011 118 130 B4 also discloses an electronic brake pressure control in which the braking forces are distributed onto the vehicle axles depending on an ascertained actual differential slip or an ascertained differential speed of the wheels, in order to decelerate the vehicle as desired. In this case, the brake pressure at the wheel brakes of the rear wheels is limited if the actual differential slip exceeds a setpoint differential slip. The setpoint differential slip is dependent on the setpoint vehicle deceleration in this case, wherein the setpoint differential slip increases at higher setpoint vehicle decelerations in order to ensure a more sensitive transition to an ABS control which engages sooner in this case than in the event of a constant setpoint brake slip. The disadvantage in this case is that an increase of the setpoint differential slip at a high vehicle setpoint deceleration effectuates an early activation of the ABS control, whereby the braking behavior becomes less calm and less safe, since the ABS control must engage sooner.

An electronic brake force distribution is disclosed in DE 10 2006 045 317 A1, in the case of which the braking forces are distributed onto the vehicle axles depending on the vehicle deceleration rather than depending on the differential slip. For this purpose, it is provided to measure an actual vehicle deceleration and, once a maximum deceleration, i.e. a certain threshold value for the actual vehicle deceleration, has been reached, to control the brake pressure at the rear axle. The maximum deceleration is defined, in this case, in such a way that the rear wheels have a greater tendency to lock up at this value than do the front wheels. A tendency for the rear wheels to lock up is therefore adapted to the tendency for the front wheels to lock up. After the maximum deceleration has been exceeded, it is provided to build up the brake pressure at the wheel brakes of the rear wheels in a controlled manner, wherein the gradient is lower than the gradient of the brake pressure that is building up at the wheel brakes of the front wheels. As a result, the brake pressure at the wheel brakes of the rear axle tracks the brake pressure at the wheel brakes of the front wheels, i.e. is held lower by a certain value. The disadvantage in this case is that, above the maximum deceleration, the braking behavior is turbulent overall, due to the tracking, and is perceived as unpleasant.

SUMMARY

In an embodiment, the present invention provides a method for controlling a vehicle deceleration in a vehicle comprising an ABS braking system. The method includes detecting a setpoint vehicle deceleration predetermined by a driver; establishing a maximum deceleration and a minimum deceleration, in each case as a function of the detected setpoint vehicle deceleration; detecting an actual vehicle deceleration; and controlling a brake pressure at wheel brakes of a vehicle axle to be controlled as a function of the detected actual vehicle deceleration by controlling ABS brake valves. Controlling the brake pressure at the wheel brakes of the vehicle axle as a function of the detected actual vehicle deceleration comprises: increasing the brake pressure at the wheel brakes of the vehicle axle to be controlled when the actual vehicle deceleration is less than the minimum deceleration for achieving a minimum braking effect, and limiting the brake pressure at the wheel brakes of the vehicle axle to be controlled when the actual vehicle deceleration is greater than the maximum deceleration for limiting the braking effect of the vehicle axle to be controlled.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide methods and devices for electronically controlling a vehicle deceleration in an ABS braking system that ensure a pleasant and safe braking process having a steady braking behavior.

According to embodiments of the invention a brake pressure at wheel brakes of a vehicle axle is controlled as a function of a detected actual vehicle deceleration, i.e. a negative actual acceleration of the vehicle, wherein the brake pressure at the wheel brakes of this vehicle axle is limited when the actual vehicle deceleration is greater than a maximum deceleration, and the brake pressure is increased at the wheel brakes of this vehicle axle when the actual vehicle deceleration is less than a minimum deceleration. In this case, "limit" is understood to mean that the brake pressure at the wheel brakes of the vehicle axle to be controlled must not be further increased, i.e., the brake pressure can only be held at the present value or, depending on a driver request, can be reduced to a lower value.

Therefore, according to embodiments of the invention, the vehicle deceleration is controlled (vehicle deceleration control) by an appropriate adjustment of the brake pressures as a function of the maximum deceleration and the minimum deceleration. As a result, the control behavior in the vehicle can be advantageously calmed down, since further control interventions that intensify the braking are prevented once the maximum deceleration has been reached.

The actual vehicle deceleration is determined, in this case, for example, by an acceleration sensor or on the basis of the derivative of a vehicle reference speed determined with the aid of wheel speed sensors. It can be taken into account, in this case, whether the vehicle is already being decelerated without an actuation of the brakes, for example due to rolling resistances and air resistances, a road inclination, or a retarder in the vehicle. In this case, a method can be based on a difference of a measured actual vehicle deceleration and a corresponding offset vehicle deceleration.

The maximum deceleration and the minimum deceleration are dependent, in particular, on a setpoint vehicle deceleration predetermined by the driver, and so a maximum deceleration characteristic curve and a minimum deceleration characteristic curve result. The setpoint vehicle deceleration can be determined, for example, by a brake signal transmitter in this case, i.e. for example a displacement sensor which detects an actuation travel of a brake valve or a brake pedal by the driver, or a pressure sensor which detects a brake pressure delivered by the driver with the aid of a brake valve. Upon detection of a setpoint vehicle deceleration, the value of the maximum deceleration or the minimum deceleration is determined from the characteristic curves and is used as the basis for the subsequent vehicle deceleration control. In this case, the course of the maximum deceleration characteristic curve is a function of the setpoint vehicle deceleration and is, for example, constant or, advantageously, harmonic, i.e. steadily increasing without steps.

As a result, a pleasant braking sensation and an improved fineness of control can be advantageously achieved. This is the case because, due to the limitation of the brake pressure to the maximum deceleration characteristic curve—which is also referred to as the feeling curve—which is harmonic as a function of the setpoint vehicle deceleration, the braking force on the vehicle axle to be controlled is limited in such a way that a resultant actual vehicle deceleration is perceived by the driver as pleasant. The course of the feeling curve also allows for an improved fineness control, since the brake pressure can be controlled with greater sensitivity as a function of the setpoint vehicle deceleration, i.e. the driver's intention.

Preferably, the brake pressure is held at the vehicle axle to be controlled when, for a certain predetermined setpoint vehicle deceleration, the actual vehicle deceleration is greater than the maximum deceleration. As a result, the braking process takes place more calmly overall, since tracking is not carried out, at least by means of the vehicle deceleration control according to embodiments of the invention, i.e. the brake pressure is preferably also not reduced within the scope of the limitation. A pressure reduction can also be provided only according to one alternative embodiment.

If the actual vehicle deceleration is greater than or equal to the maximum deceleration and if the driver increases the setpoint vehicle deceleration by means of an additional actuation of the brake pedal or a brake valve, a stronger deceleration of the vehicle is effectuated only by a further vehicle axle that is not controlled by means of the vehicle deceleration control according to embodiments of the invention, unless, as a result thereof, the actual vehicle deceleration becomes less than the maximum deceleration again.

The maximum deceleration is established, as a function of the setpoint vehicle deceleration, in particular in such a way that a quasi unnecessary braking can be avoided by means of the vehicle axle to be controlled, by limiting the brake pressure of this vehicle axle to a value which is at most required in order to brake the vehicle according to the setpoint vehicle deceleration predetermined by the driver. It can be taken into account in particular, in this case, which braking effect can be achieved by the further, non-controlled vehicle axle. This has the advantage, for example, that, in the event of a high setpoint vehicle deceleration or a high actual vehicle deceleration, the weight of the vehicle is displaced onto the front axle, and the rear axle, which is controlled in this case, is more likely to lock up. A lock-up of the rear wheels can be avoided by limiting the brake pressure.

In order to ensure a pleasant and safe braking process even in different load states of the vehicle, the maximum deceleration is preferably load-dependent as a function of the setpoint vehicle deceleration. The maximum deceleration characteristic curve therefore has a flatter course at a high load and is steeper, i.e. rises more strongly, at a low load, and so the brake pressure at the vehicle axle to be controlled is already held at a lower actual vehicle deceleration at a high load than is the case at a lower load. As a result, it can be advantageously achieved that the driver is informed about the load condition of the vehicle by way of the delivered brake effect, because the vehicle is decelerated more strongly at a low load than at a high load given the same setpoint vehicle deceleration.

If the actual vehicle deceleration is less than the minimum deceleration, a brake force limitation at the vehicle axle to be controlled is advantageously terminated or blocked in order to ensure that a minimum deceleration is not prevented, for example, in order to meet requirements for a minimum braking effect—required by law—as a function of the setpoint vehicle deceleration; the safety increases.

The brake pressure at the vehicle axle to be controlled can be increased and held when the actual vehicle deceleration is less than the maximum deceleration and is greater than the minimum deceleration. Preferably, a reduction of the brake pressure can also be provided. In this region, a control of the vehicle deceleration can additionally take place as a function of a differential slip (differential slip regulation, DSR) between the vehicle axles.

For this purpose, an actual differential slip is determined, i.e. a difference between a present rotational behavior of the vehicle axle to be controlled, for example the rear axle, and the other vehicle axle, for example the front axle. The rotational behavior is characterized by a brake slip or a rotational speed of the wheels of the corresponding vehicle axle. The actual differential slip therefore indicates how strongly the one vehicle axle is over-braked or under-braked relative to the other vehicle axle. "Over-braking" is understood to mean, in this case, that the vehicle axle to be controlled rotates more slowly than the other vehicle axle, i.e. in particular has a higher brake slip, while "under-braking" is understood to mean that the vehicle axle to be controlled has a lower brake slip than the other vehicle axle, i.e. rotates more rapidly.

Preferably, the actual differential slip is proportional to a difference of the brake slip of the rear axle driven by an engine minus the brake slip of the front axle, preferably normalized to the brake slip of the driven rear axle. The calculation method is not limited thereto, however; for example the actual differential slip can also be determined, as a function of the rotational speed of the vehicle axles, from the difference of the rotational speed of the front axle minus the rotational speed of the driven rear axle, preferably normalized to the rotational speed of the front axle. Other calculation methods are also conceivable.

The differential slip regulation controls the actual differential slip to a setpoint differential slip by way of limiting—preferably holding—the brake pressure at the vehicle axle to be controlled, in order to avoid over-braking, and by way of increasing the brake pressure at the vehicle axle to be controlled, in order to avoid an under-braking of the vehicle axle to be controlled; the lock-up tendency of the vehicle axle to be controlled is therefore adapted to the lock-up tendency of the other vehicle axle which is not brake pressure-controlled by means of the differential slip regulation. For this purpose, the actual differential slip and the setpoint differential slip are compared and the brake pressure at the vehicle axle to be controlled is adjusted accordingly if there is a deviation. For this purpose, in the case of untimed brake valves, a tolerance above and/or below the setpoint differential slip can be advantageously provided, in order to calm down the control behavior.

In this case, the differential slip regulation is also subject to the requirement that the brake pressure be limited when the actual vehicle deceleration is greater than the maximum deceleration, e.g. due to the differential slip regulation, and is increased when it is less than the minimum deceleration. In the case that the actual vehicle deceleration is less than the minimum deceleration, the differential slip regulation is terminated in a pulsed manner; a control as a function of the actual differential slip is then no longer permitted, for safety reasons. The purpose of limiting the brake pressure when the maximum deceleration has been exceeded by the actual vehicle deceleration is to advantageously calm down the course of deceleration, because fewer control interventions take place.

Advantageously, the brake pressure at the vehicle axle to be controlled can also be reduced when the actual vehicle deceleration is greater than the maximum deceleration and the vehicle axle to be controlled is over-braked. As a result, the actual vehicle deceleration advantageously drops more rapidly to the maximum deceleration and the over-braking of the vehicle axle to be controlled decreases simultaneously; the safety and braking comfort continue to increase.

The setpoint differential slip, to which the differential slip regulation controls the actual differential slip, can be, for example, constant and can be determined at the beginning of a braking process, i.e. when braking forces have not yet taken effect, in order to achieve an offset differential slip which takes into account an engine drag torque, a wear of the wheels and, optionally, road conditions. In the case of the aforementioned calculation method, the offset differential slip is greater than zero, since the driven rear axle rotates more slowly than the co-rotating front axle, due to an engine drag torque.

Advantageously, the setpoint differential slip can also be dependent on the actual vehicle deceleration or the setpoint vehicle deceleration. For example, in the case of an increasing actual vehicle deceleration or a setpoint vehicle deceleration, the setpoint differential slip can drop from the offset differential slip to zero, i.e. in the direction of a synchronous rotational behavior of the wheels of the vehicle axle to be controlled and of the other vehicle axle, in such a way that, in the event that the rear axle is the vehicle axle to be controlled, a lock-up of the loadable rear axle is counteracted. If the actual differential slip determined according to the aforementioned calculation method is greater than the setpoint differential slip in this case, the rear axle is over-braked relative to the front axle, i.e. the rear axle brake pressure is limited. If the actual differential slip is less than the setpoint differential slip, however, the rear axle is under-braked relative to the front axle, i.e. the rear axle brake pressure is increased. Therefore, the rear axle brake pressure is already limited at a lower actual differential slip, i.e. at a lower relative over-braking, due to the setpoint differential slip which decreases as the actual vehicle deceleration or the setpoint vehicle deceleration increases.

As a result, it is advantageously taken into account that, in the event of a high actual vehicle deceleration or setpoint vehicle deceleration, the loadable rear axle has a greater tendency to slip, i.e. is over-braked and, therefore, according to the aforementioned calculation method, an actual differential slip is present that tends to be higher and that is further intensified in the unloaded state. If the setpoint differential slip shifts toward lower values in the event of an increasing actual vehicle deceleration or setpoint vehicle deceleration, the rear axle brake pressure is limited already at a lower actual differential slip; i.e. a higher rear axle brake slip as compared to the front axle brake slip; a premature engagement of the higher-order ABS control can be prevented; the driving behavior becomes calmer and safer as a result.

If the front axle is the vehicle axle to be controlled, for example in the case of a commercial vehicle having a higher load on the rear axle, e.g. a bus, the front axle is pressed onto the underlying surface to a lesser extent and therefore begins to have more of a tendency to slip, wherein, according to the aforementioned calculation method, the actual differential slip therefore has a tendency to diminish, proceeding from the offset differential slip. If the actual differential slip determined according to the aforementioned calculation method is greater than the setpoint differential slip, the front axle is under-braked relative to the rear axle, i.e. the front axle brake pressure is increased. If the actual differential slip is less than the setpoint differential slip, however, the front axle is over-braked relative to the rear axle, i.e. the rear axle brake pressure is limited. Therefore, due to the fact that the setpoint differential slip decreases from the offset differential slip toward zero, a premature engagement of the higher-order ABS control at the front axle can be avoided; the driving behavior therefore becomes calmer and safer overall.

Advantageously, a load of the vehicle can be ascertained from the actual differential slip. If the vehicle is unloaded, i.e. a low weight acts on the rear axle, the rear wheels have a greater tendency to lock-up than is the case with a fully loaded vehicle having a heavier weight on the rear axle, provided the brake actuation is the same or in the case of a predetermined setpoint vehicle deceleration. The actual differential slip therefore varies as a function of the load of the vehicle in the case of a predetermined setpoint vehicle deceleration. A load of the vehicle can therefore be inferred from the actual differential slip and a distribution of the braking forces onto the vehicle axles as a function of the load can be indirectly achieved by means of the differential slip regulation.

The vehicle is preferably a commercial vehicle, in the case of which the weight on the rear axle varies between a loaded state and an unloaded state to a greater extent relative to the front axle. In this case, the rear axle of the vehicle is advantageously the vehicle axle to be controlled by means of the brake pressure control according to embodiments of the invention. An intervention by the brake pressure control according to embodiments of the invention into the braking behavior of a front axle is then not carried out. In addition, a second rear axle can also be controlled in the same way. In principle, a brake pressure control of the front axle for the purpose of controlling the vehicle deceleration is also possible in a similar way, however, wherein the braking behavior at the rear axle is then not controlled by means of the method according to an embodiment of the invention. This is useful, for example, when the commercial vehicle is a bus, in the case of which a reversed load condition of the vehicle axles results.

In order to control the vehicle deceleration by adjusting the corresponding brake pressures at the wheel brakes of the vehicle axle to be controlled, a device according to an embodiment of the invention, for example a vehicle deceleration control unit, controls ABS brake valves, i.e. inlet valves and outlet valves, designed as 2/2 solenoid valves, at the wheel brakes of the vehicle axle to be controlled, in such a way that a brake pressure at the vehicle axle to be controlled is either held or increased. According to one embodiment, the vehicle deceleration control unit can also alternatively reduce the brake pressure by means of venting, in order to increase or decrease the braking force.

In this case, the ABS brake valves are part of an antilock brake system (ABS) present in the vehicle for controlling the brake slip at the individual wheels. The ABS brake valves can be controlled by an ABS control unit as well as by the vehicle deceleration control unit. The ABS control unit takes precedence over the vehicle deceleration control unit, however, and so, when the ABS control unit detects a brake slip at one of the wheels of the vehicle axle to be controlled that is too great, a conventional ABS control is carried out and the vehicle deceleration control according to embodiments of the invention is prohibited by the vehicle deceleration control unit.

Preferably, different load-dependent maximum deceleration characteristic curves, on which the vehicle deceleration control is based, depending on the load of the vehicle, can be stored in the vehicle deceleration control unit. The load condition, as a function of which the maximum deceleration characteristic curve is selected, can be derived, for example, from the above-described differential slip regulation, i.e. from the load-dependent actual differential slip. It is also possible, however, to utilize any type of axle load sensor in order to determine the load condition, which measures either a displacement between, for example a vehicle frame and the loaded vehicle axle, or a pressure acting on the loadable vehicle axle or a support bellows on the loadable vehicle axle with the aid of a pressure sensor, on the basis of which the vehicle deceleration control unit can infer a load condition.

The load information can also be transmitted from an ECAS system to the vehicle deceleration control unit via a CAN-BUS, which electronically controls the air suspension of the vehicle as a function of an axle load. In addition, the vehicle deceleration control unit can ascertain a present vehicle mass from information regarding the present engine power and the resultant vehicle acceleration, on the basis of which—combined with knowledge of the unloaded vehicle mass—a load can be inferred. In addition, the presence of a trailer, which can be considered to be a proportion of the ascertained mass of the vehicle, can also be taken into account in the determination of the load or in the selection of the maximum deceleration characteristic curve, wherein this information can be provided to the vehicle deceleration control unit, for example by a trailer control unit, via the CAN-BUS.

Figure 1:
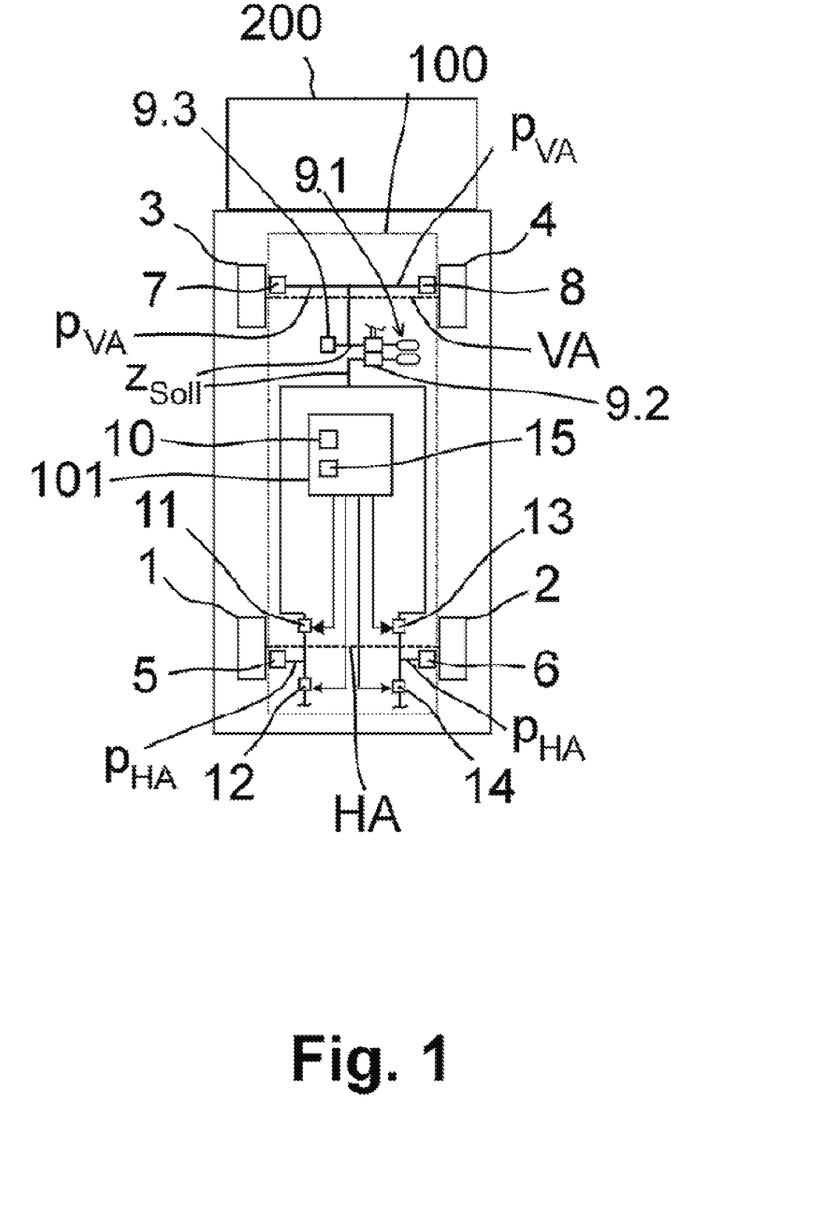
FIG. 1 shows a block diagram of a vehicle comprising an electronic brake system.

FIG. 1 shows a vehicle 200 comprising a brake system 100 including the components that are relevant here. Accordingly, a rear axle HA including rear wheels 1, 2 and a front axle VA including front wheels 3, 4 are provided. The rear wheels 1, 2 can be braked with the aid of rear wheel brakes 5, 6 and the front wheels 3, 4 can be braked with the aid of front wheel brakes 7, 8 by way of a brake pressure p provided by brake cylinders 9.1 being transferred via a dual-circuit brake valve 9.2 to the rear wheel brakes 5, 6 and the front wheel brakes 7, 8 as a function of a setpoint vehicle deceleration $z_{Soll}$ predetermined by the driver. In this case, the setpoint vehicle deceleration $z_{Soll}$ can be detected, for example, by a pressure sensor 9.3 functioning as a brake signal transmitter, which detects a brake pressure delivered by the driver with the aid of the brake valve 9.2; this is a front axle brake pressure $p_{VA}$, by way of example, according to FIG. 1. The brake system 100 can be an electro-hydraulic or electro-pneumatic brake system, i.e. a fluid pressure or an air pressure is delivered. The brake system 100 is electrically controlled in particular by an EBS control unit 101.

For the purpose of brake slip-controlled braking, the brake system 100 comprises an antilock brake system (ABS) with an ABS control unit 10 which controls the ABS brake valves 11, 12, 13, 14 as a function of a detected brake slip. Only the ABS brake valves 11, 12, 13, 14 at the rear wheels 1, 2 are represented in FIG. 1, for the sake of simplicity. The front wheels 3, 4 can be brake slip-controlled via the ABS control unit 10 in the same way as the rear wheels 1, 2. According to this embodiment, the ABS control unit 10 is integrated into the EBS control unit 101.

Each of the ABS brake valves 11, 12, 13, 14 is designed as a 2/2 solenoid valve, wherein one inlet valve 11, 13 and one outlet valve 12, 14 are provided for each rear wheel brake 5, 6, respectively. If the inlet valves 11, 13 are opened and the outlet valves 12, 14 are blocked, a rear axle brake pressure $p_{HA}$ delivered by the brake valve 9.2 is applied to the rear wheel brakes 5, 6 and a corresponding braking is therefore effectuated. Conversely, if the inlet valves 11, 13 are blocked and the outlet valves 12, 14 are opened, the rear wheel brakes 5, 6 are vented and, therefore, the braking effect is reduced. If the inlet valves 11, 13 as well as the outlet valves 12, 14 are blocked, a rear axle brake pressure $p_{HA}$ acting on the rear wheel brakes 5, 6 is held.

Within the scope of the exemplary embodiment, no distinction is made between the left and the right rear wheel brakes 5, 6 with respect to the brake pressure or the braking effect, i.e. the same rear axle brake pressure $p_{HA}$ is applied to both rear wheel brakes 5, 6, in order to achieve, together with the front wheel brakes 7, 8, a braking effect corresponding to the setpoint vehicle deceleration $z_{Soll}$. It is also possible, however, to control the ABS brake valves 11, 12, 13, 14 of the left and the right rear wheel brakes 5, 6 independently of each other, and so different brake pressures can be present at each of the rear wheel brakes 5, 6. The same applies for the front wheel brakes 7, 8 which are both acted upon by the same front axle brake pressure $p_{VA}$.

According to an embodiment of the invention, in addition to the ABS control, an electronic control of the vehicle deceleration (vehicle deceleration control) is provided, which controls the rear axle brake pressure $p_{HA}$ in such a way that a certain actual vehicle deceleration $z_{Ist}$, which is dependent on the setpoint vehicle deceleration $z_{Soll}$, i.e. a negative acceleration, sets in in the vehicle 200. According to this embodiment, "control" is understood to mean holding or increasing the rear axle brake pressure $p_{HA}$. According to one embodiment, a reduction of the rear axle brake pressure $p_{HA}$ can also be provided, under certain conditions.

The vehicle deceleration control is controlled by a vehicle deceleration control unit 15 which, according to this embodiment, is integrated into the EBS control unit 101 and is designed for controlling the ABS brake valves 11, 12, 13, 14 at the rear wheel brakes 5, 6. The ABS control unit 10 takes precedence over the vehicle deceleration control unit 15 with respect to the control of the ABS brake valves 11, 12, 13, 14, however. This means, upon detection of an impermissible brake slip at one of the rear wheels 1, 2, a vehicle deceleration control that has already started is terminated and a conventional ABS control is carried out by the ABS control unit 10.

According to this embodiment, the vehicle deceleration control establishes—as described in the following—the actual vehicle deceleration $z_{Ist}$ as a function of the setpoint vehicle deceleration $z_{Soll}$, at which the ABS brake valves 11, 12, 13, 14 are controlled and the vehicle 200 is therefore decelerated:

Stored in the vehicle deceleration control unit 15 are a maximum deceleration characteristic curve $z_{Kmax}$, which is dependent on the setpoint vehicle deceleration $z_{Soll}$, and a minimum deceleration characteristic curve $z_{Kmin}$, which represent established dependencies of a maximum deceleration $z_{max}$ and a minimum deceleration $z_{min}$, respectively, on the setpoint vehicle deceleration $z_{Soll}$. The maximum deceleration characteristic curve $z_{Kmax}$ can also be referred to as a feeling curve which has a harmonic course and therefore induces a pleasant braking sensation for the driver.

Figure 2:
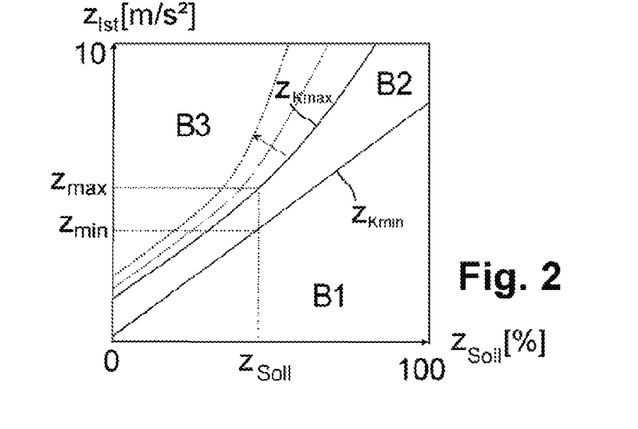
FIG. 2 shows a diagram of the dependence of an actual vehicle deceleration on a setpoint vehicle deceleration in order to establish a control behavior.

According to FIG. 2, the setpoint vehicle deceleration $z_{Soll}$ is plotted in a diagram, by way of example, as a percent of the actuation of the brake valve 9.2 against the actual vehicle deceleration $z_{Ist}$ in m/s². The maximum deceleration characteristic curve $z_{Kmax}$ and the minimum deceleration characteristic curve $z_{Kmin}$ subdivide the diagram into three regions B1, B2, B3. A first region B1 lies between the x-axis ($z_{Soll}$) and the minimum deceleration characteristic curve $z_{Kmin}$, a second region B2 lies between the minimum deceleration characteristic curve $z_{Kmin}$ and the maximum deceleration characteristic curve $z_{Kmax}$, and a third region B3 lies above the maximum deceleration characteristic curve $z_{Kmax}$.

These three regions B1, B2, B3 establish how the vehicle deceleration control unit 15 is permitted to control the ABS brake valves 11, 12, 13, 14 at the rear wheel brakes 5, 6 and, therefore, which braking force or which rear axle brake pressure $p_{HA}$, as a function of the setpoint vehicle deceleration $z_{Soll}$ and the actual vehicle deceleration $z_{Ist}$, is delivered to the rear wheel brakes 5, 6. Since the vehicle deceleration control does not intervene into the braking behavior of the front axle VA, a brake pressure distribution between the front axle VA and the rear axle HA is indirectly achieved as a result. In this case, the brake pressure p corresponding to the setpoint vehicle deceleration $z_{Soll}$—optionally superimposed by an ABS control—is delivered directly to the front wheel brakes 7, 8.

The rear axle brake pressure $p_{HA}$ is controlled depending on the three regions B1, B2, B3, as follows:

If a certain brake pressure $p_{HA}$, $p_{VA}$ is delivered to the wheel brakes 5, 6, 7, 8 via the brake valve 9.2 and, therefore, a setpoint vehicle deceleration $z_{Soll}$ is demanded by the driver, and the resultant actual vehicle deceleration $z_{Ist}$, which results from the braking of the front and the rear wheel brakes 5, 6, 7, 8, lies in the first region B1, the vehicle deceleration control unit 15 triggers an opening of the inlet valves 11, 13 and a closing of the outlet valves 12, 14, and so a build-up of pressure can take place at the rear wheel brakes 5, 6 and, therefore, an increasing braking by the rear wheels 1, 2 is also made possible.

The rear axle brake pressure $p_{HA}$ is therefore increased when the actual vehicle deceleration $z_{Ist}$ at a certain predetermined setpoint vehicle deceleration $z_{Soll}$ is less than the minimum deceleration $z_{min}$ which results from the minimum deceleration characteristic curve $z_{Kmin}$ for the setpoint vehicle deceleration $z_{Soll}$. According to FIG. 2, it is indicated, by way of example, that a minimum deceleration $z_{min}$ and a maximum deceleration $z_{max}$ result from the y-values of the characteristic curves $z_{Kmin}$ and $z_{Kmax}$ at a certain setpoint vehicle deceleration $z_{Soll}$ (x-value).

This first region B1 is determined by the minimum deceleration characteristic curve $z_{Kmin}$ which can specify, for example, a minimum braking—established by law—as a function of the setpoint vehicle deceleration $z_{Soll}$. This means, below the minimum deceleration characteristic curve $z_{Kmin}$, a braking is forced for safety reasons unless the higher-order ABS control intervenes.

If the actual vehicle deceleration $z_{Ist}$ at a certain setpoint vehicle deceleration $z_{Soll}$ lies in the third region B3, i.e. the actual vehicle deceleration $z_{Ist}$ is greater than the maximum deceleration $z_{max}$ derived from the maximum deceleration characteristic curve $z_{Kmax}$ for the setpoint vehicle deceleration $z_{Soll}$, the inlet valves 11, 13 and the outlet valves 12, 14 are controlled in such a way that the rear axle brake pressure $p_{HA}$ is limited.

It is therefore not permitted to further increase the rear axle brake pressure $p_{HA}$ even if the setpoint vehicle deceleration $z_{Soll}$ predetermined by the driver is increased, unless the actual vehicle deceleration $z_{Ist}$ moves back into the first or the second region B1, B2 due to the increasing setpoint vehicle deceleration $z_{Soll}$. In the third region B3, the vehicle 200 can therefore be more strongly decelerated only by means of the front wheel brakes 7, 8—into the braking behavior of which the vehicle deceleration control does not intervene—by way of the front axle brake pressure $p_{VA}$ being further increased.

The rear axle brake pressure $p_{HA}$ and, therefore, the braking force of the rear wheel brakes 5, 6, is therefore limited—as a function of the actual vehicle deceleration $z_{Ist}$—to a certain value which is predetermined by the maximum deceleration characteristic curve $z_{Kmax}$. By means of the control to this harmonic maximum deceleration characteristic curve $z_{Kmax}$, a braking sensation that is pleasant for the driver can be achieved.

If the actual vehicle deceleration $z_{Ist}$ lies between the maximum deceleration characteristic curve $z_{Kmax}$ and the minimum deceleration characteristic curve $z_{Kmin}$, i.e. in the second region B2, an increase and a holding of the rear axle brake pressure $p_{HA}$ is permitted, in order to decelerate the vehicle 200.

According to this exemplary embodiment, in the second region B2, the actual vehicle deceleration $z_{Ist}$ is additionally controlled as a function of an actual differential slip $DS_{Ist}$ by way of holding or increasing the rear axle brake pressure $p_{HA}$ depending on the level of an actually present actual differential slip $DS_{Ist}$. A differential slip regulation (DSR) is therefore carried out.

According to the embodiment, differential slip is understood to mean the difference between a rotational behavior of the front wheels 3, 4 and a rotational behavior of the rear wheels 1, 2. According to this example, the rotational behavior is characterized by a front axle brake slip $DS_{VA}$ or a rear axle brake slip $DS_{HA}$, both of which result from the mean value of the brake slips of the individual wheels 1, 2, 3, 4 of the particular vehicle axle VA, HA.

According to this embodiment, the actual differential slip $DS_{Ist}$ is formed from the front axle brake slip $DS_{VA}$ and the rear axle brake slip $DS_{HA}$ as follows:

$$DS_{Ist} \sim (DS_{HA} - DS_{VA})/DS_{HA} * 100\%; \quad (1.1)$$

the difference in the rotational behavior of the vehicle axles VA, HA is therefore defined by a deviation of the front axle brake slip $DS_{VA}$ from the rear axle brake slip $DS_{HA}$ which increases, in particular, when the rear axle HA is over-braked, i.e. has a greater tendency to slip, in contrast to the front axle VA.

An alternative method for calculating the rotational behavior of the rear wheels 1, 2 relative to the rotational behavior of the front wheels 3, 4 is to determine the actual differential slip $DS_{Ist}$ from rotational speeds $v_{VA}$ and $v_{HA}$ of the vehicle axles VA, HA, respectively, i.e.

$$DS_{Ist} \sim (v_{VA} - v_{HA})/v_{VA} * 100\%, \quad (1.2)$$

wherein the rotational speeds $v_{VA}$ and $v_{HA}$ can result, for example, from a mean value of the rotational speeds of the wheels 1, 2, 3, 4 of the particular vehicle axle VA, HA.

The two aforementioned formulas 1.1 and 1.2 are merely examples for obtaining a variable characterizing the difference in the rotational behavior. Other dependencies that characterize this difference can also be utilized, however.

For the differential slip regulation, it is provided that the vehicle deceleration control unit 15 constantly determines the actual differential slip $DS_{Ist}$ after actuation of the brake valve 9.2 and given a setpoint vehicle deceleration $z_{Soll}$. If the actual brake slip $DS_{Ist}$ deviates from a setpoint brake slip $DS_{Soll}$, wherein a predetermined tolerance value $DS_T$ can be utilized in the case of untimed ABS brake valves 11, 12, 13, 14, and if the actual vehicle deceleration $z_{Ist}$ lies in the second region B2, the vehicle deceleration control unit 15 controls the ABS brake valves 11, 12, 13, 14 of the rear wheels 1, 2 in such a way that the actual differential slip $DS_{Ist}$ corresponds to the setpoint differential slip $DS_{Soll}$ once more, within the tolerance $DS_T$:

If the actual differential slip $DS_{Ist}$ lies below the setpoint differential slip $DS_{Soll}$, the rear axle HA is under-braked relative to the front axle VA, based on the setpoint differential slip $DS_{Soll}$. In this case, the ABS inlet valves 11, 13 are opened, and so the rear axle brake pressure $p_{HA}$ is increased. If the actual differential slip $DS_{Ist}$ lies above the setpoint differential slip $DS_{Soll}$, the rear axle brake slip $DS_{HA}$ is greater than the front axle brake slip $DS_{VA}$ based on the setpoint differential slip $DS_{Soll}$, i.e. the rear axle HA is over-braked. In this case, the rear axle brake pressure $p_{HA}$ is limited, and so the braking effect at the rear wheels 1, 2 is not further increased.

Figure 3:
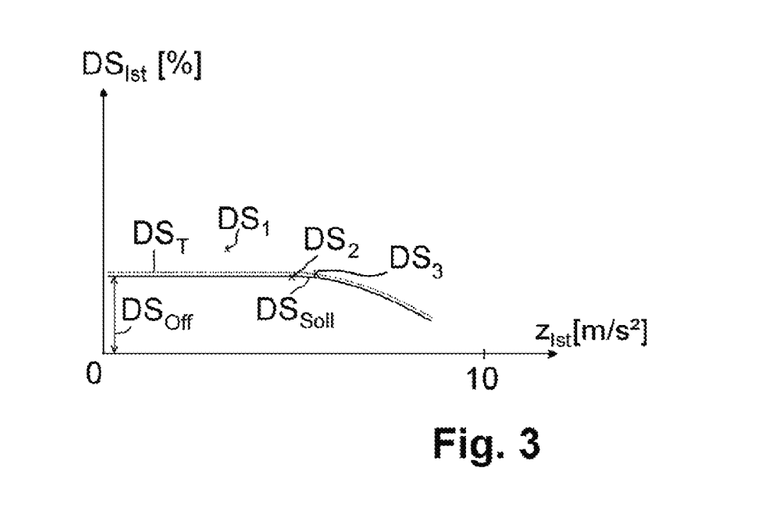
FIG. 3 shows a diagram of the dependence of a setpoint differential slip on an actual vehicle deceleration for use in a differential slip regulation.

According to this embodiment, the setpoint differential slip $DS_{Soll}$, which is controlled to, is dependent on the actual vehicle deceleration $z_{Ist}$, as represented in FIG. 3. At low actual vehicle decelerations $z_{Ist}$, the setpoint differential slip $DS_{Soll}$ is initially constant and lies at a certain offset differential slip $DS_{Off}$. According to this embodiment, the offset differential slip $DS_{Off}$ is determined at the beginning of a braking process, i.e. when braking forces of the wheel brakes 5, 6, 7, 8 have not yet taken effect, and so, in particular, an engine drag torque and a wear of the wheels 1, 2, 3, 4 are taken into account. The offset differential slip $DS_{Off}$ is positive in a calculation of the actual differential slip $DS_{Ist}$ according to formula 1.1 or 1.2 when the rear axle HA is the axle driven by the engine of the vehicle 100, since the rear axle HA rotates more slowly due to the engine drag torque. Proceeding from the offset differential slip $DS_{Off}$, the setpoint differential slip $DS_{Soll}$ drops in the direction toward zero.

If the actual differential slip, for example at the beginning of the differential slip regulation, lies above the setpoint differential slip $DS_{Soll}$ and also above the tolerance $DS_T$ at the point $DS_1$, the rear axle brake pressure $p_{HA}$ is initially limited. According to this exemplary embodiment, only one tolerance $DS_T$ is provided above the setpoint differential slip $DS_{Soll}$. Alternatively or additionally, a tolerance $DS_T$ can also be provided below the setpoint differential slip $DS_{Soll}$. If a greater setpoint vehicle deceleration $z_{Soll}$ is demanded by the driver by means of a further actuation of the brake valve 9.2, the vehicle 200 is additionally braked only by means of the front wheel brakes 7, 8; the actual vehicle deceleration $z_{Ist}$ increases. As a result, the actual differential slip $DS_{Ist}$ shifts from the point $DS_1$ to the point $DS_2$, for example precisely onto the $DS_{Soll}$ curve, and so the limitation of the rear axle brake pressure $p_{HA}$ is canceled and the rear axle brake pressure $P_{Ha}$ is increased in a pulsed manner. Due to the additional braking effect of the rear wheel brakes 5, 6, the point $DS_2$ now shifts, in the continued course of the braking process, in the direction of an increasing actual vehicle deceleration $z_{Ist}$, back in the direction above the $DS_{Soll}$ curve, to the point $DS_3$. If the actual differential slip $DS_{Ist}$ reaches the tolerance value $DS_T$ or lies slightly above it, a further pressure increase at the rear wheel brakes 5, 6 is blocked and the rear axle brake pressure $p_{HA}$ is limited again.

In the case of an increasing actual vehicle deceleration $z_{Ist}$, the setpoint differential slip $DS_{Soll}$ drops to lower values. As a result, the circumstances are taken into consideration that the rear axle HA has a tendency to be over-braked in the case of high decelerations of the vehicle 200 and, in particular, a low load or a high load, a high load center of gravity and a short wheel base, i.e. said rear axle tends to slip, i.e. the actual differential slip $DS_{Ist}$ tends to shift toward higher values when the actual differential slip $DS_{Ist}$ is calculated according to one of the two formulas 1.1 or 1.2. The object of the method is therefore that of carrying out a brake-force limitation at the rear axle HA for a longer time and blocking a pressure increase in the event of a high deceleration, to which the front axle VA contributes in the absence of pressure limitation. A slip of the rear axle HA and an intervention by the higher-order ABS control induced as a result can be avoided and the braking becomes calmer and safer.

If the second region B2 is exited in the direction of the first region B1 due to the differential slip regulation or for other reasons, the differential slip regulation is advantageously terminated in a pulsed manner and the rear axle brake pressure $p_{HA}$ is increased. If the second region B2 is exited in the direction of the third region B3, the rear axle brake pressure $p_{HA}$ is limited or held.

According to one embodiment, for the case in which there is an actual differential slip $DS_{Ist}$ greater than the setpoint differential slip $DS_{Soll}$ in the third region B3, i.e. the rear axle HA is over-braked, the outlet valves 12, 14 can also be opened, and so a pressure reduction takes place at the rear wheel brakes 5, 6, in order to reach or fall below the maximum deceleration characteristic curve $z_{Kmax}$ as quickly as possible and to reduce the over-braking of the rear axle HA.

The vehicle deceleration control unit 15 does not intervene into the braking behavior of the front wheel brakes 7, 8 during the control of the actual differential slip $DS_{Ist}$, either.

By means of the differential slip regulation, an electronic braking force or brake pressure distribution is effectuated as a function of the axle loads on the front axle VA and the rear axle HA, as follows:

If the vehicle is unloaded, i.e. a low weight acts on the rear axle HA, the rear wheels 1, 2 have a greater tendency to lock-up than is the case with a fully loaded vehicle 200 having a heavier weight on the rear axle HA, provided the brake actuation is the same or given a predetermined setpoint vehicle deceleration $z_{Soll}$. This results from the fact that the rear wheels 1, 2 are pressed more strongly onto the underlying surface. The load has at least no significant influence on the front axle VA, due to the high engine weight.

The actual differential slip $DS_{Ist}$ therefore varies as a function of the load of the vehicle 200 in the case of a certain setpoint vehicle deceleration $z_{Soll}$. Although the differential slip regulation cannot directly measure the weight acting on the rear axle HA, it always controls the ABS valves 11, 12, 13, 14 at the point in time at which the load-dependent actual differential slip $DS_{Ist}$ differs from the setpoint differential slip $DS_{Soll}$ by at least the tolerance $DS_T$. Since the vehicle deceleration control unit 15 does not control the front axle brake pressure $p_{VA}$, a distribution of the braking forces onto the vehicle axles VA, HA as a function of the load is indirectly achieved by the differential slip regulation. A load of the vehicle 200 can therefore be inferred from the actual differential slip $DS_{Ist}$.

Figure 4A:
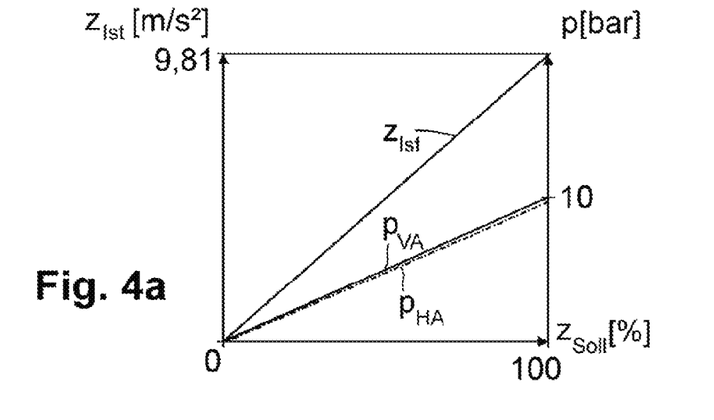
FIGS. 4a,b show a dependence of a brake pressure delivered to the vehicle axles as a function of a load.
Figure 4B:
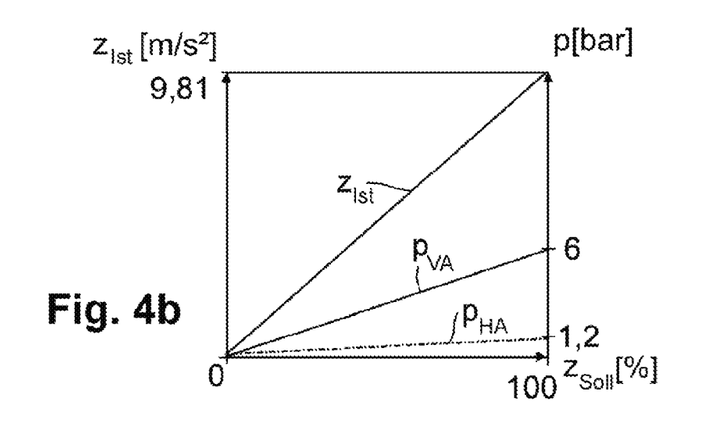

This can result in the situations shown in FIGS. 4a and 4b, in the case of different loads: If the vehicle 200 is fully loaded, the braking force is distributed approximately uniformly onto both vehicle axles HA, VA, as represented in the exemplary embodiment in FIG. 4a. This means, approximately the same brake pressure $p_{VA}$, $p_{HA}$ is applied onto the front and the rear wheel brakes 5, 6, 7, 8 as a function of the setpoint vehicle deceleration $z_{Soll}$, in order to effectuate an actual vehicle deceleration $z_{Ist}$ that corresponds, for example, to $z_{Ist}=1$ g ($g=9.81$ m/s$^2$) in the case of $z_{Soll}=100\%$ when a brake pressure of $p_{VA}=p_{HA}=10$ bar is applied to each of the front and rear wheel brakes 5, 6, 7, 8.

If the vehicle 200 is less than fully loaded, e.g. unloaded as represented in the exemplary embodiment in FIG. 4b, and has a mass in the unloaded state that is approximately one-third the mass of the fully loaded vehicle 200, a greater portion of the braking is effectuated by the front wheel brakes 7, 8, as represented in FIG. 4b. In this example, given a setpoint vehicle deceleration $z_{Soll}$ of 100% (corresponds to 1 g, given $g=9.81$ m/s$^2$, according to the aforementioned example), a front axle brake pressure $p_{VA}$ of 6 bar and a rear axle brake pressure $p_{HA}$ of only 1.2 bar is set, in order to achieve an actual vehicle deceleration $z_{Ist}$ of 100%, corresponding to the setpoint vehicle deceleration $z_{Soll}$, as represented in FIG. 4a for the fully loaded state. The front axle VA is braked less strongly and the rear axle HA is braked substantially less strongly, whereby a premature lock-up can be avoided in the case of a low load on the front axle VA and, in particular, the rear axle HA.

The maximum deceleration characteristic curve $z_{Kmax}$ and the minimum deceleration characteristic curve $z_{Kmin}$ can be stored in the vehicle deceleration control unit 15, wherein at least the maximum deceleration characteristic curve $z_{Kmax}$ can vary as a function of the load. The maximum deceleration characteristic curve $z_{Kmax}$ shifts toward higher actual vehicle decelerations $z_{Ist}$, as indicated in FIG. 2 using dashed lines, and so the third region B3 is reduced in size, i.e. at a certain setpoint vehicle deceleration $z_{Soll}$, the rear axle brake pressure $p_{HA}$ is first held at a higher actual vehicle deceleration $z_{Ist}$. The vehicle 200 is therefore more strongly decelerated in the unloaded state than in the loaded state given the same setpoint vehicle deceleration $z_{Soll}$. The driver can therefore be information about the load condition by way of the shift of the maximum deceleration characteristic curve $z_{Kmax}$, and so the driver can react appropriately.

An ECAS system can be provided for the purpose of measuring the load condition, which electronically controls the air suspension of the vehicle 200 and, for this purpose, comprises a displacement sensor (not shown) which measures the displacement between the rear axle HA and a reference point on the vehicle 200 as a function of the load. In addition, a mechanical-electronic, axle load-dependent brake pressure distribution unit (antilock brake system), which is also controlled by a displacement sensor or a pressure sensor, can also deliver the value of the load. Both systems, i.e. ECAS and ALB, can transmit, for example via the CAN-BUS, the load condition detected by these systems to the vehicle deceleration control unit 15 which selects the maximum deceleration characteristic curve $z_{Kmax}$ as a function thereof It is also possible, however, that the vehicle deceleration control unit 15 ascertains the load condition itself. For this purpose, the load can be determined on the basis of the measured actual differential slip $DS_{Ist}$ as described above and, on the basis thereof, the load condition can be ascertained. Alternatively, a further displacement sensor can also be situated in the vehicle 200, between a frame, which is fixedly connected to the vehicle, and the vehicle axles HA, VA, the load-dependent displacement path of which can be detected by the vehicle deceleration control unit. The vehicle load can be inferred from the displacement path.

Alternatively, engine performance data and vehicle acceleration data can be transmitted from an engine control unit (not shown) via the CAN-BUS, on the basis of which the vehicle deceleration control unit 15 can infer a mass of the vehicle 200 and, therefore, an additional load with respect to an empty weight of the vehicle 200. In this case, it can also be taken into consideration whether there is a trailer coupled to the vehicle 200, which can be a proportion of the ascertained mass of the vehicle 200 and can additionally influence the driving behavior at the rear axle HA. This information can be transmitted by a trailer control unit via the CAN-BUS. In addition, a behavior of a traction control system can be taken into consideration, on the basis of which a load condition can also be determined.

Figure 5:
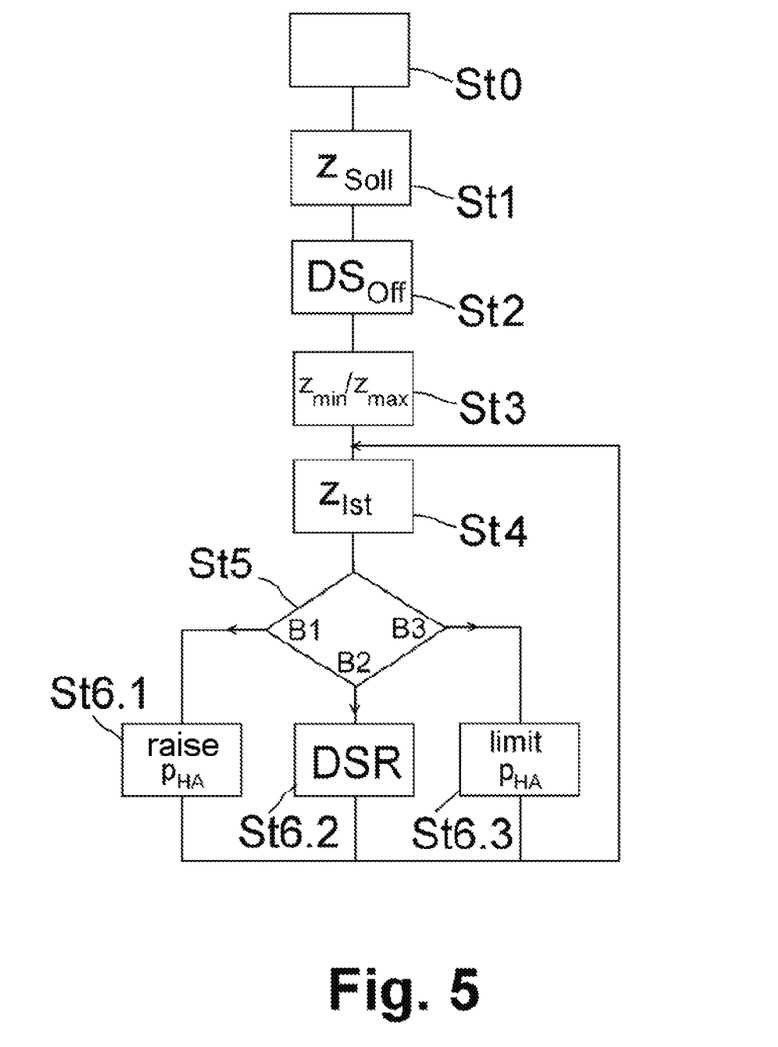
FIG. 5 shows a flow chart for carrying out the electronic vehicle deceleration control according to the invention.

According an embodiment of the invention, a method for electronic brake pressure control according to FIG. 5 is carried out as follows. The braking is started in a step St0, e.g. via an actuation of the brake valve 9.2 by the driver. In a first step St1, the setpoint vehicle deceleration $z_{Soll}$ is detected with the aid of the brake signal transmitter 9.3 as a function of the actuation of the brake valve 9.2, wherein either an actuation travel of the brake valve 9.2 or a rear axle or front axle brake pressure $p_{HA}$, $p_{VA}$, which is delivered via actuation of the brake valve 9.2, is detected.

In a second step St2, an offset differential slip $DS_{Off}$ is established at the beginning of the braking process, i.e. when braking forces have not yet taken effect. This offset differential slip $DS_{Off}$ can differ from zero due to an engine drag torque or a wear of the wheels 1, 2, 3, 4 and, therefore, varying wheel circumferences.

In a third step St3, a stored maximum deceleration characteristic curve $z_{Kmax}$ is selected as a function of the load of the vehicle 200. A minimum deceleration characteristic curve $z_{Kmin}$ is also established. The detected setpoint vehicle deceleration $z_{Soll}$ therefore yields values, from the characteristic curves $z_{Kmax}$, $z_{Kmin}$, for the maximum deceleration $z_{max}$ and the minimum deceleration $z_{min}$, which are used as the basis for the following electronic vehicle deceleration control.

In a fourth step St4, the actual vehicle deceleration $z_{Ist}$ is detected. This takes place, for example, by way of an acceleration sensor (not shown) or on the basis of the derivative of an ascertained vehicle reference speed $v_{ref}$ which can be determined, for example, from a mean value of the rotational speeds of the wheels 1, 2, 3, 4.

In a fifth step St5, a region B1, B2, B3 of the diagram according to FIG. 2 is assigned to the actual vehicle deceleration $z_{Ist}$ determined in the fourth step St4 by the vehicle deceleration control unit 15 as a function of the setpoint vehicle deceleration $z_{Soll}$, or a comparison is carried out to determine whether the actual vehicle deceleration $z_{Ist}$ is greater than or equal to the maximum deceleration $z_{max}$ or the minimum deceleration $z_{min}$.

If the actual vehicle deceleration $z_{Ist}$ lies in the first region B1, i.e. if it is less than the minimum deceleration $z_{min}$, then, in a following step St6.1, the inlet valves 11, 13 of the vehicle axle to be controlled—the rear axle HA in this case—are opened and the outlet valves 12, 14 are closed, and so the rear axle brake pressure $p_{HA}$ is increased.

If the actual vehicle deceleration $z_{Ist}$ lies in the second region B2, i.e. if it is less than the maximum deceleration $z_{max}$ and greater than the minimum deceleration $z_{min}$, then, in a step 6.2, the inlet valves 11, 13 are controlled—as a function of the actual differential slip $DS_{Ist}$, which is preferably determined by the vehicle deceleration control unit 15 during the entire braking process—in such a way that it corresponds, within the tolerance $DS_T$, to the setpoint differential slip $DS_{Soll}$ stored in the vehicle deceleration control unit 15, which is equal to the offset differential slip $DS_{Off}$ established in the second step St2, at least at the beginning of the braking process, and which can vary during the braking process, depending on the vehicle deceleration.

In the third region B3, in a step St6.3, the inlet valves 11, 13 and the outlet valves 12, 14 are closed, and so the rear axle brake pressure $p_{HA}$ is held. The braking force of the rear wheel brakes 5, 6 is therefore limited—as a function of the setpoint vehicle deceleration $z_{Soll}$—to a certain vehicle deceleration-dependent value which is predetermined by the maximum deceleration characteristic curve $z_{Kmax}$ or the maximum deceleration $z_{max}$.

After the steps St6.1, St6.2 or St6.3, the electronic vehicle deceleration control within a braking process begins starts over at the fourth step St4. Therefore, during a braking process, the detected actual vehicle deceleration $z_{Ist}$ is constantly assigned to a region and the rear axle brake pressure $p_{HA}$ is adjusted accordingly.

Figure 6:
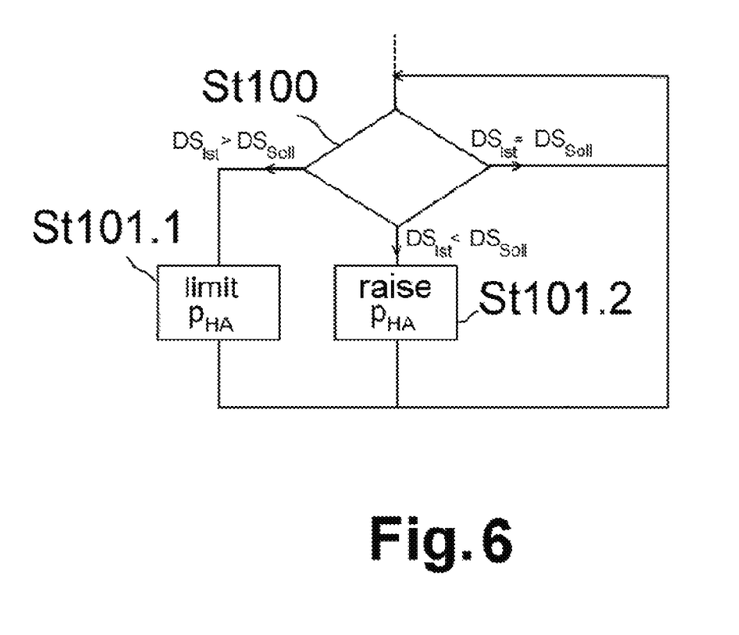
FIG. 6 shows a flow chart for carrying out the differential slip regulation as part of the electronic vehicle deceleration control according to FIG. 5.

The differential slip regulation in step St6.2 takes place according to FIG. 6, as follows: In a step St100, the actual differential slip $DS_{Ist}$ is compared to the setpoint differential slip $DS_{Soll}$ which is stored in the vehicle deceleration control unit 15 as represented in FIG. 3 and in which the offset differential slip $DS_{Off}$ determined in step St2 of the vehicle deceleration control is taken into consideration.

If the actual differential slip $DS_{Ist}$ is greater than the setpoint differential slip $DS_{Soll}$, the rear axle HA is over-braked relative to the front axle VA. If the actual differential slip $DS_{Ist}$ in this case lies above the tolerance $DS_T$, the vehicle deceleration control unit 15 triggers, in a step St101.1, a limitation of the rear axle brake pressure $p_{HA}$, and so the braking force of the rear wheel brakes 5, 6 of the rear axle HA is not increased further. If the actual differential slip $DS_{Ist}$ is less than the setpoint differential slip $DS_{Soll}$ or is less than the tolerance $DS_T$, the vehicle deceleration control unit 15 demands an increase of the rear axle brake pressure $p_{HA}$ in a step St101.2, since the rear axle HA is under-braked relative to the front axle VA. If the actual differential slip $DS_{Ist}$ is equal to the setpoint differential slip $DS_{Soll}$ within the tolerance $DS_T$, the method starts from the beginning; the lock-up tendency of the rear axle HA has been adapted to the lock-up tendency of the front axle VA.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS
(COMPONENT OF THE DESCRIPTION)

1, 2 rear wheels
3, 4 front wheels
5, 6 rear wheel brakes
7, 8 front wheel brakes
9.1 brake cylinder
9.2 dual-circuit brake valve
9.3 pressure sensor/brake signal transmitter
10 ABS control unit
11, 13 ABS inlet valves for rear wheel brakes 5, 6
12, 14 ABS outlet valves for rear wheel brakes 5, 6
15 vehicle deceleration control unit
100 brake system
101 EBS control unit
200 vehicle
B1, B2, B3 first, second and third regions
DSR differential slip regulation
$DS_{Ist}$ actual differential slip
$DS_{Soll}$ setpoint brake slip
$DS_{Off}$ offset differential slip
$DS_{HA}$ rear axle brake slip
$DS_{VA}$ front axle brake slip
$DS_T$ differential slip tolerance value
HA rear axle
p brake pressure
$p_{VA}$ front axle brake pressure
$p_{HA}$ rear axle brake pressure
VA front axle
$v_{VA}$ rotational speed front axle VA
$v_{HA}$ rotational speed rear axle HA
$z_{Kmax}$ maximum deceleration characteristic curve
$z_{Kmin}$ minimum deceleration characteristic curve
$z_{max}$ maximum deceleration
$z_{min}$ minimum deceleration
$z_{Soll}$ setpoint vehicle deceleration
$z_{Ist}$ actual vehicle deceleration

The invention claimed is:

1. A method for controlling a vehicle deceleration in a vehicle comprising an ABS braking system, the method comprising:
    detecting a setpoint vehicle deceleration predetermined by a driver;
    establishing a maximum deceleration and a minimum deceleration, in each case as a function of the detected setpoint vehicle deceleration;
    detecting an actual vehicle deceleration; and
    controlling, as a function of the detected actual vehicle deceleration, respective brake pressures at wheel brakes of a vehicle axle by controlling ABS brake valves so as to:
        increase the respective brake pressures at the wheel brakes of the vehicle axle when the actual vehicle deceleration is less than the minimum deceleration thereby achieving a minimum braking effect at the vehicle axle, and
        limit the respective brake pressures at the wheel brakes of the vehicle axle when the actual vehicle deceleration is greater than the maximum deceleration thereby limiting the braking effect at the vehicle axle.

2. The method as claimed in claim 1, wherein the maximum deceleration is established based on a maximum deceleration characteristic curve that represents a dependence of the maximum deceleration on the setpoint vehicle deceleration, and
    wherein the minimum deceleration is established based on a minimum deceleration characteristic curve that represents a dependence of the minimum deceleration on the setpoint vehicle deceleration.

3. The method as claimed in claim 2, wherein the maximum deceleration characteristic curve is dependent on a load of the vehicle.

4. The method as claimed in claim 3, wherein the load of the vehicle is measured with aid of an axle load sensor or is derived from a detected actual differential slip.

5. The method as claimed in claim 3, wherein a gradient of the maximum deceleration characteristic curve is inversely proportional to the load of the vehicle, and so the respective brake pressures are limited in the case of a low load of the vehicle given higher detected actual vehicle decelerations in contrast to a high load of the vehicle.

6. The method as claimed in claim 2, wherein the maximum deceleration characteristic curve has a harmonic course without steps, in order to limit the respective brake pressures without jerkily decelerating the vehicle.

7. The method as claimed in claim 1, wherein the respective brake pressures at the wheel brakes of the vehicle axle are held or reduced when the actual vehicle deceleration is greater than the maximum deceleration.

8. The method as claimed in claim 1, wherein the respective brake pressures at the wheel brakes of the vehicle axle are controlled as a function of a detected actual differential slip when the actual vehicle deceleration is less than the maximum deceleration and greater than the minimum deceleration, wherein the actual differential slip indicates a difference in a rotational behavior of the vehicle axle with respect to another vehicle axle.

9. The method as claimed in claim 8, wherein the actual differential slip is calculated from the difference of an ascertained rear axle brake slip minus an ascertained front axle brake slip normalized to the rear axle brake slip, or a difference of an ascertained front axle axle-speed minus an ascertained rear axle axle-speed normalized to the front axle axle-speed, wherein the rear axle is the vehicle axle driven by an engine.

10. The method as claimed in claim 8, wherein the respective brake pressures are controlled as a function of the actual differential slip in such a way that the actual differential slip corresponds to a setpoint differential slip, wherein the respective brake pressures at the wheel brakes of the vehicle axle are limited for this purpose when the vehicle axle is over-braked relative to the other vehicle axle, and is increased for this purpose when the vehicle axle is under-braked relative to the other vehicle axle.

11. The method as claimed in claim 8, wherein the respective brake pressures at the wheel brakes of the vehicle axle are reduced as a function of the actual differential slip when the actual vehicle deceleration is greater than the maximum deceleration and the vehicle axle is over-braked relative to the other vehicle axle.

12. The method as claimed in claim 10, wherein the setpoint differential slip is dependent on the detected actual vehicle deceleration or the setpoint vehicle deceleration, wherein, in the case of an increasing actual vehicle deceleration or an increasing setpoint vehicle deceleration, the setpoint differential slip decreases in the direction of a synchronous wheel rotational behavior of the wheels of the vehicle axle and of the other vehicle axle, and so the respective brake pressures at the vehicle axle are already limited in the event of a lower relative over-braking.

13. The method as claimed in claim 10, wherein, if the vehicle axle is the rear axle, respective brake pressures at the rear wheel brakes are limited when the actual differential slip is greater than the setpoint differential slip, and are increased when the actual differential slip is less than the setpoint differential slip, and wherein if the vehicle axle is the front axle, respective brake pressures at the front wheel brakes are limited when the actual differential slip is less than the setpoint differential slip, and are increased when the actual differential slip is greater than the setpoint differential slip.

14. The method as claimed in claim 1, wherein the vehicle axle is a rear axle of the vehicle or a front axle of the vehicle.

15. The method as claimed in claim 1, wherein, in the event that the respective brake pressures of the wheel brakes of the vehicle axle are limited, the respective brake pressures are held or reduced and are not increased.

16. A device for electronically controlling a vehicle deceleration in a vehicle comprising an ABS brake system, the device being configured to:

establish a maximum deceleration and a minimum deceleration as a function of a detected setpoint vehicle deceleration, the setpoint vehicle deceleration being predetermined by a driver; and control, as a function of a detected actual vehicle deceleration, respective brake pressures at wheel brakes of a vehicle axle by controlling ABS brake valves so as to:

increase the respective brake pressures at the wheel brakes of the vehicle axle when the actual vehicle deceleration is less than the minimum deceleration thereby achieving a minimum braking effect at the vehicle axle, and limit the respective brake pressures at the wheel brakes of the vehicle axle when the actual vehicle deceleration is greater than the maximum deceleration thereby limiting the braking effect at the vehicle axle.

17. The device as claimed in claim 16, wherein the vehicle axle is a rear axle or a front axle of the vehicle.

18. A vehicle comprising a brake system, the brake system comprising:

a brake valve configured to deliver a brake pressure at wheel brakes of the vehicle;

a brake signal transmitter for detecting a setpoint vehicle deceleration;

a detecting sensor configured to detect an actual vehicle deceleration;

ABS brake valves; and a device for electronically controlling a vehicle deceleration in a vehicle comprising an ABS brake system, the device being configured to:

establish a maximum deceleration and a minimum deceleration as a function of a detected setpoint vehicle deceleration, the setpoint vehicle deceleration being predetermined by a driver; and control, as a function of a detected actual vehicle deceleration, respective brake pressures at wheel brakes of a vehicle axle by controlling ABS brake valves so as to:

increase the respective brake pressures at the wheel brakes of the vehicle axle when the actual vehicle deceleration is less than the minimum deceleration thereby achieving a minimum braking effect at the vehicle axle, and limit the respective brake pressures at the wheel brakes of the vehicle axle when the actual vehicle deceleration is greater than the maximum deceleration thereby limiting the braking effect at the vehicle axle.

* * * * *